(No Model.)

J. KURTZ.
ICE MACHINE.

No. 421,175. Patented Feb. 11, 1890.

WITNESSES:
L. Douville,
O. F. Nagle.

INVENTOR:
John Kurtz.
BY John a. Niedersheim
ATTORNEY.

UNITED STATES PATENT OFFICE.

JOHN KURTZ, OF PHILADELPHIA, PENNSYLVANIA.

ICE-MACHINE.

SPECIFICATION forming part of Letters Patent No. 421,175, dated February 11, 1890.

Application filed October 9, 1889. Serial No. 326,500. (No model.)

*To all whom it may concern:*

Be it known that I, JOHN KURTZ, a citizen of the United States, residing in the city and county of Philadelphia, State of Pennsylvania, have invented a new and useful Improvement in Ice-Machines, which improvement is fully set forth in the following specification and accompanying drawings.

My invention consists of a machine embodying means whereby ice may be rapidly and effectively produced, as will be hereinafter fully set forth and definitely claimed.

Figure 1:
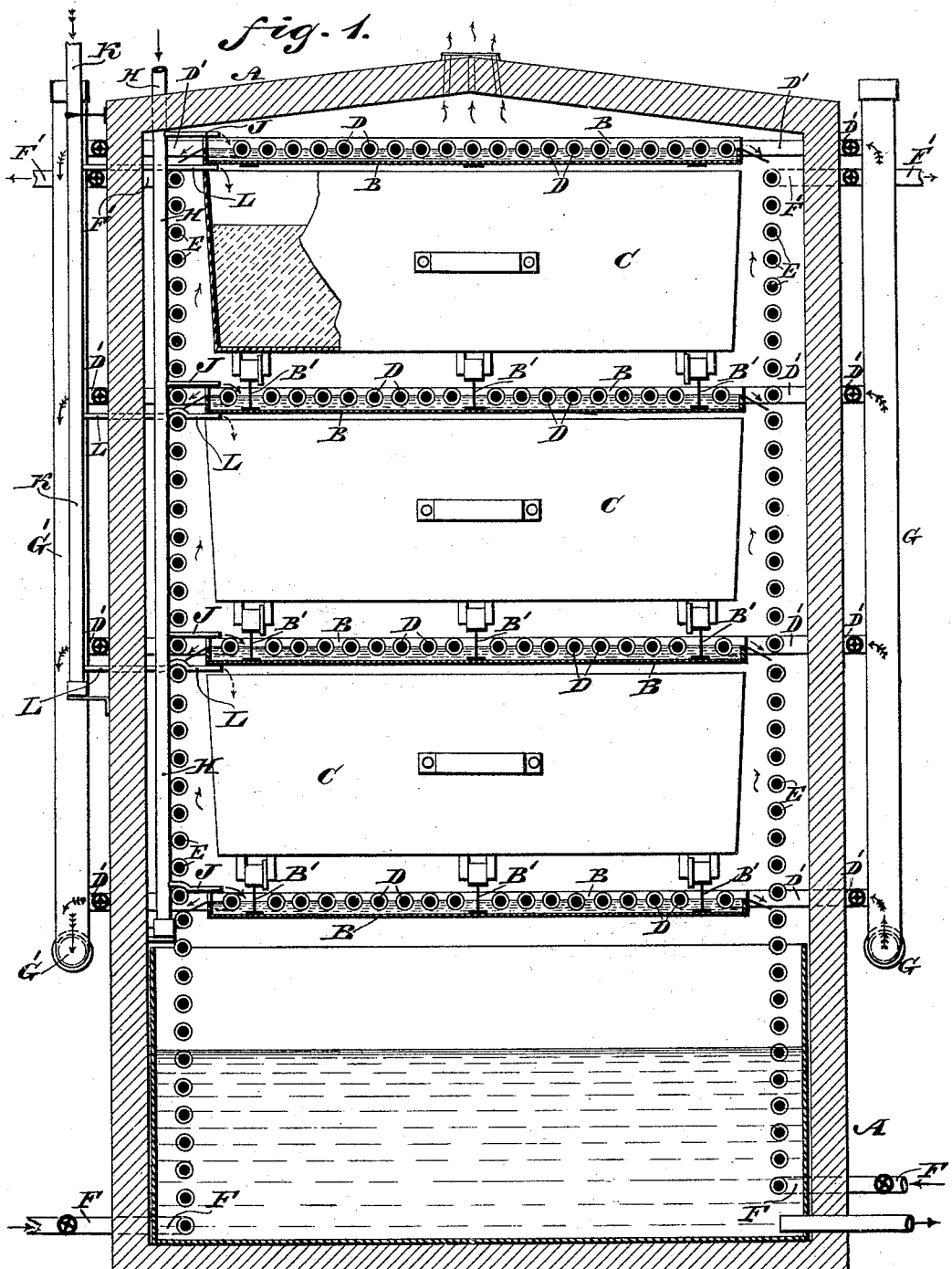
Figure 2:
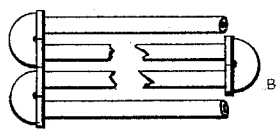

Figure 1 represents a vertical section of an ice-machine embodying my invention. Fig. 2 represents a side elevation of portion of the pipes thereof.

Similar letters of reference indicate corresponding parts in the two figures.

Referring to the drawings, A designates a house, chamber, or vessel, within which are supported the brine-holding trays B, placed one above the other and provided with tracks or rails B', on which are supported the pans C.

D designates a series of pipes in tiers for receiving brine, the same dipping into the brine in the trays B; and E designates a series of pipes for receiving ammonia, the same being arranged at the sides of said trays and the pans C, the pipes being of the form of worms or coils or connected by return-bends, as in Fig. 2, and attached with pipes F F', whereby ammonia may be admitted into said pipes E at the pipe F, traverse the same, and then discharge at the opposite end through the pipes F', when it may be directed elsewhere and collected for further use. The brine-pipes D are connected by branches D' with supply and discharge pipes G G'.

H designates a pipe for supplying brine to the trays B, the same having branches J, which are located above the sides of said trays, so as to direct the brine thereinto; and K designates a pipe for supplying water to the pans C, the same having branches L, which are located above the sides of said pans, so as to direct the water thereinto. The several pipes are provided with valves or stop-cocks, so as to regulate the supply of material admitted thereinto.

The operation is as follows: The brine, which is supplied as desired from any source of supply, as a tank or reservoir, by means of the pipes H and J to the trays B, flows partly or entirely over the brine-pipes D therein, and then overflows, dropping on the ammonia-pipes E, the surplus brine finally reaching the bottom of the chamber A, where it may be collected for further use. Water is gradually admitted into the pans C, and, as is evident, it is converted into ice, it being observed that the pans are virtually inclosed by the brine and ammonia pipes, whereby the operation of ice-making is rapid and effective. As the water enters the pans the heat or warm air in the house is discharged at the top thereof, as shown by the arrows. When the work is accomplished, the pans may be run out of the chamber A on the rails B', after which the ice is removed and the pans are restored to their places, so that said work may be repeated. The brine which flows through the trays B and over the pipes E keeps said pipes clear of ice and equalizes the cold in the ice-making house A. As the fresh water is allowed to enter the pans gradually or slowly, time is allowed for heat or cold air from said water to escape, thus preventing the formation of bubbles in the ice.

Having thus described my invention, what I claim as new, and desire to secure by Letters Patent, is—

1. A casing having trays with cooling-pipes therein and pipes at the sides of the casing, in combination with pans supported between said trays, whereby they are surrounded by said pipes, substantially as described.

2. The brine-trays containing brine-circulating pipes and provided with rails, in combination with freezing-pans located between said trays and supported on said rails, and ammonia-pipes at the sides of the pans, substantially as described.

3. Pipes for brine, ammonia, and water, in combination with trays for receiving brine and pans for receiving water to be frozen, located between the trays, the brine-pipes dipping into the trays and the ammonia-pipes being located at the sides of the pans, so that the brine from the trays flows thereover, substantially as described.

JOHN KURTZ.

Witnesses:
JOHN A. WIEDERSHEIM,
WM. C. WIEDERSHEIM.